United States Patent [19]
Bura et al.

[11] 4,249,347
[45] Feb. 10, 1981

[54] DIAMOND PASTE

[76] Inventors: Svetlana T. Bura, ulitsa Dorogozhitskaya, 26, kv. 31; Jury I. Nikitin, ulitsa Krasnopolskaya, 11/13, kv. 41, both of Kiev, U.S.S.R.

[21] Appl. No.: 76,597

[22] Filed: Sep. 18, 1979

Related U.S. Application Data

[63] Continuation of Ser. No. 539,807, Jan. 9, 1975, abandoned.

[30] Foreign Application Priority Data

Mar. 11, 1974 [SU] U.S.S.R. ............................. 2003239

[51] Int. Cl.$^3$ ............................. B24B 1/00; C08J 5/14
[52] U.S. Cl. ....................................... 51/298; 51/299; 51/304; 51/307; 106/8
[58] Field of Search ................. 51/299, 302, 303, 304, 51/305, 306, 307; 106/8, 9, 3

[56] References Cited

U.S. PATENT DOCUMENTS

| 2,129,377 | 9/1938 | Libovitz et al. | 51/305 |
| 2,443,698 | 6/1948 | Snyder | 51/306 |
| 3,789,050 | 1/1974 | Loricchio | 51/299 |

FOREIGN PATENT DOCUMENTS

| 258058 | 11/1970 | U.S.S.R. | 51/299 |
| 313842 | 11/1971 | U.S.S.R. | 51/299 |
| 336340 | 4/1972 | U.S.S.R. | 51/306 |

Primary Examiner—Donald J. Arnold
Attorney, Agent, or Firm—Fleit & Jacobson

[57] ABSTRACT

A diamond paste to be used for treating surfaces of workpieces comprising diamond powder in a mechanical mixture with surface-active and lubricating (cooling) components.

The components of the paste are used in the following quantities (in % by weight):
  diamond powder filler: 30-2
    green silicon carbide: up to 38
    aerosil: up to 5
  surface-active substance
    stearine: 20-5
  low-molecular weight heat-resistant synthetic rubber: 20-40
  lubricating cooling substance
    castor oil: 15-5
    vaseline: 15-5

4 Claims, No Drawings

DIAMOND PASTE

This is a continuation of application Ser. No. 539,807, filed Jan. 9, 1975, and now abandoned.

The invention relates to grinding and polishing compositions and may be used in the final finishing of surfaces of workpieces made of various materials, especially in the manufacture of components where elevated temperatures (above 100° C.) are developed in the working zone during the lapping (polishing) of such components.

More particularly, the invention relates to a diamond paste to be used for treating the surface of workpieces.

Known in the art are diamond pastes having the following composition:
1. diamond powder
   boron carbide
   oleic acid
   stearine
   organosilicon liquid
2. diamond powder
   abrasive filler
   industrial oil
   oleic acid
   stearine (see USSR Inventor's Certificate No. 213999).

The paste made according to the first-mentioned formulation (USSR Application No. 1714475/23-4 of Nov. 16, 1971) is heat resistant at a temperature of the surface being treated up to 85°–90° C. When used for treating the surface of workpieces at a temperature above 90° C., the viscosity of the paste considerably decreases resulting in a reduced productivity and impaired quality of treatment. In addition, boron carbide included in the composition of the paste is sensitive to abrupt temperature changes and oxidized at elevated temperatures which results in the decarbonization thereof (cf. T. M. Ippolitov, Diamond Abrasive Treatment, Moscow, Mashinostroenie Publishers, 1962).

As regards the grading of boron carbide, the boron carbide powder is commercially available having a grading coarser than M28 so that diamond pastes filled with boron carbide cannot be produced with a grading finer than 28/20.

The diamond paste manufactured according to USSR Inventor's Certificate No. 213 999 contains a considerable amount of liquid components (up to 60%) having a low viscosity and stearine (melting point 50°–60° C.). This results in a rapid stratification and liquiefaction thereof at low temperatures (40°–45° C.), increased losses of the abrasive component, and finally, impaired performance and quality of treatment. When used for treating surfaces at a temperature above 100° C., the paste completely leaks out of the treatment zone.

It is an object of the invention to provide a diamond paste having an elevated heat resistance as compared to the prior-art pastes used for similar purpose.

Another object of the invention is to provide a diamond paste featuring a predetermined viscosity which remains constant during the employment of the paste for lapping, grinding and finishing of the surface of workpieces.

Among other objects of the invention there is the provision of a diamond paste having a composition eliminating unproductive losses of the abrasive component and improving the quality of treatment of the surfaces of workpieces.

These and other objects are accomplished by the provision of a diamond paste to be used for treating the surfaces of workpieces, comprising diamond powder in a homogeneous mechanical mixture with surface-active and lubricating cooling components, which is characterized in that the lubricating cooling component comprises a low-molecular weight heat-resistant synthetic rubber used in an amount of at least 1/5 by weight of the paste.

It is the presence of synthetic rubber in the composition of the diamond paste that provides for an improved heat resistance of the paste and maintenance of a predetermined viscosity of the mass thereof.

In accordance with one embodiment of the invention, the diamond paste is characterized in that with a filler included in the composition thereof, the filler comprises an organo-silicon compound - aerosil.

This contributes to still more improved properties of the diamond paste to be used for the above-mentioned purposes.

And finally, in accordance with another embodiment of the invention, the diamond paste is characterized in that it has the following composition (in % by weight):
  diamond powder filler: 30-2
    green silicon carbide: up to 38
    aerosil: up to 5
    surface-active substance—stearine: 20-5
    low-molecular weight heat-resistant synthetic rubber: 20-40
  lubricating cooling substance
    castor oil: 15-5
    vaseline: 15-5

The above-mentioned precise composition of the diamond paste according to the invention has experimentally proved to exhibit a high performance as regards both the heat resistance of the paste composition and quality and productivity of treatment of the surface of workpieces.

The invention will now be described in detail with reference to a specific embodiment thereof illustrated by an example of the production technique for preparing the diamond paste, as well as one of the precise compositions thereof which was studied experimentally.

Depending on the proportioning of certain components and type of a diluent used, the diamond paste according to the invention may be used for treating surfaces whose temperature varies over the range from 140° to 200° C. (and even up to 350° C.) without any critical changes in the viscosity. This is ensured due to a combination of a low-molecular weight heat-resistant synthetic rubber, aerosil, vaseline and castor oil. A conventional viscosity of low-molecular weight heat-resistant synthetic rubber is 601-1080 S, heat resistance is 2.0. The use of vaseline and castor oil makes it possible to obtain the paste having a required lubricating capacity, while the viscosity of castor oil remains unchanged under heating. Stearine is used as surfactant.

The production technique for preparing the paste comprises the following steps:
(1) castor oil is poured into a vessel containing an appropriate quantity of rubber, then vaseline is added, and the mixture is thoroughly stirred to obtain a homogeneous viscous white mass (mixuture 1);
(2) diamond powder and abrasive filler are poured into mixture 1, and the mass is stirred for 15-20 minutes at room temperature (mixture 2);

(3) aerosil is gradually added to mixture 2, and the mass is again thoroughly stirred (mixture 3);

(4) stearine is heated at 40°–50° C. and is poured into mixture 3, whereafter the paste is stirred at room temperature to obtain a mass with diamond grains uniformly distributed within the entire volume thereof.

Positive results have been obtained in testing the paste of the following composition (in % by weight):

diamond powder: 10% low-molecular weight heat-resistant synthetic rubber: 40% stearine: 20% vaseline: 15% castor oil: 10% aerosil: 5%

When tested, the diamond paste having the above-given composition exhibited heat resistance which was considerably better than that of the prior art pastes; moreover, it has been found that the viscosity of the new paste remained at a predetermined level during a long-term use for mechanical abrasive treatment of the surface of workpieces, while unproductive losses of the abrasive component-diamond powder were reduced, and high quality of the workpiece surface after the treatment was achieved even at comparatively high temperatures at which prior art pastes were substantially unsuitable and inefficient.

It should be noted that while only one of possible precise compositions of the diamond paste was cited hereabove, the tests have been conducted with different contents of the above-mentioned components of the paste; thus, diamond powder was used in an amount from 2 to 30% by weight, green silicon carbide from a tiny fraction to 38% by weight, aerosil up to 5% by weight, stearine from 5 to 20% by weight, low-molecular weight heat-resistant synthetic rubber from 20 to 40% by weight, and castor oil and vaseline from 5 to 15% by weight, respectively.

Even with such variable contents of the components it has been revealed that the positive properties of the diamond paste according to the invention remained unchanged.

What is claimed is:

1. A diamond paste for treating surfaces of workpieces consisting essentially of (in % by weight):

diamond powder: 30-2 surface-active substance-stearine: 20-5 low-molecular weight heat-resistant synthetic rubber: 20-40 lubricating cooling substance-castor oil: 15-5 vaseline: 15-5

2. The diamond paste of claim 1 which also includes, as a filler, at least one of aerosil and green silicon carbide.

3. The diamond paste of claim 2, wherein the aerosil is present in an amount of up to 5% by weight and the green silicon carbide is present in an amount of up to 38% by weight.

4. The diamond paste of claim 5, wherein the synthetic low-molecular weight heat-resistant synthetic rubber has a viscosity of from about 601-1080 S.

* * * * *